United States Patent [19]

Menzie

[11] 4,325,237
[45] Apr. 20, 1982

[54] LOCK PLUG FOR GLAD HAND BRAKE LINE COUPLER

[75] Inventor: Larry L. Menzie, Antioch, Calif.

[73] Assignee: James G. O'Neill, Walnut Creek, Calif.

[21] Appl. No.: 185,217

[22] Filed: Sep. 8, 1980

[51] Int. Cl.³ .................... B60R 25/00; E05B 65/12
[52] U.S. Cl. .......................................... 70/14; 70/237; 70/258; 70/371; 280/507
[58] Field of Search ............ 280/507; 285/80, DIG. 2, 285/68-69; 138/89; 303/89; 70/14, 237, 57, 58, 168, 169, 165, 167, 371, 428, 460, 258

[56] References Cited

U.S. PATENT DOCUMENTS

| | | | |
|---|---|---|---|
| 1,889,056 | 11/1932 | Blanchard | 70/169 |
| 2,073,109 | 3/1937 | Kirkwood | 70/371 X |
| 2,092,572 | 9/1937 | Deane | 70/168 X |
| 2,154,118 | 4/1939 | Ames | 70/168 X |
| 3,139,291 | 6/1964 | Geresy | 280/507 |
| 3,226,133 | 12/1965 | Geresy | 280/507 |
| 3,492,023 | 1/1970 | Thompson | 280/507 |
| 3,693,383 | 9/1972 | Krupen et al. | 70/371 X |
| 3,879,066 | 4/1975 | Kozinski | 285/69 |
| 3,982,413 | 9/1976 | Stone et al. | 70/229 |
| 4,226,103 | 10/1980 | Strickland | 70/237 |

FOREIGN PATENT DOCUMENTS

| | | | |
|---|---|---|---|
| 230026 | 1/1911 | Fed. Rep. of Germany | 70/428 |
| 603188 | 9/1934 | Fed. Rep. of Germany | 70/428 |
| 2048032 | 4/1972 | Fed. Rep. of Germany | 70/57 |
| 430637 | 2/1948 | Italy | 70/14 |
| 587335 | 1/1959 | Italy | 70/229 |
| 30321 | 1/1920 | Norway | 70/428 |

Primary Examiner—Roy D. Frazier
Assistant Examiner—Carl F. Pietruszka
Attorney, Agent, or Firm—James G. O'Neill

[57] ABSTRACT

A lock plug for use with a glad hand coupler of the air brake line of a tractor - trailer. The lock plug is insertable into and held in place locked within the air passage of the glad hand coupler to prevent unauthorized hookup of the plugged glad hand coupler with a mating glad hand coupler.

5 Claims, 3 Drawing Figures

U.S. Patent    Apr. 20, 1982    4,325,237
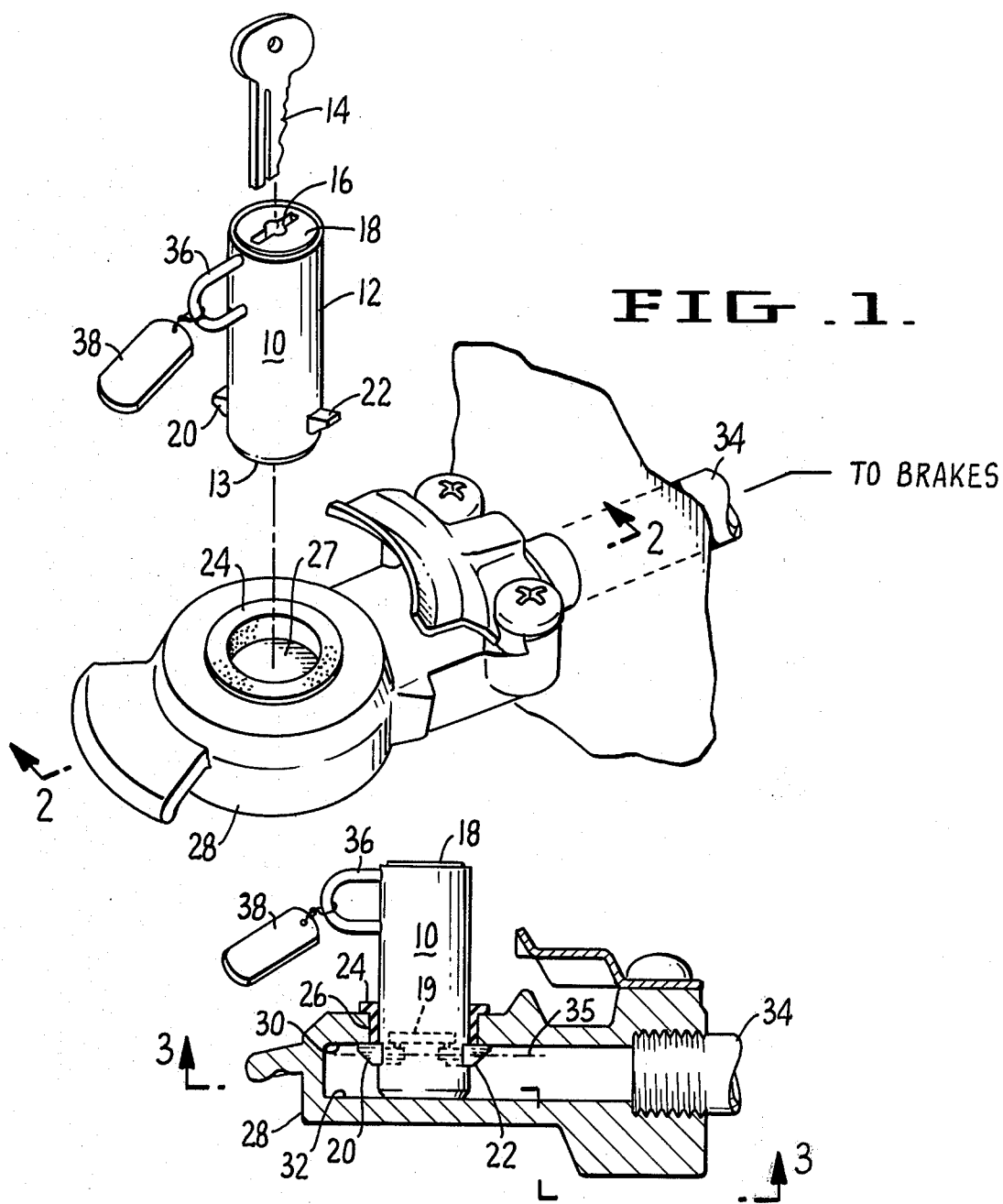
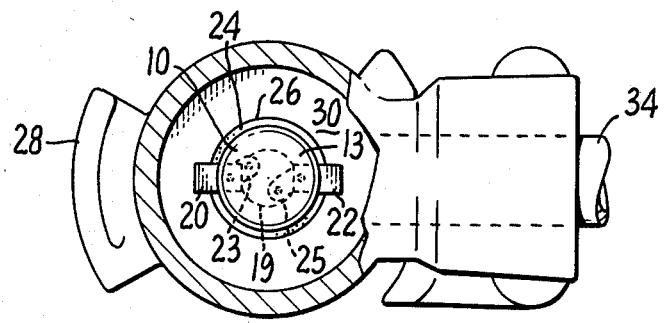

LOCK PLUG FOR GLAD HAND BRAKE LINE COUPLER

BACKGROUND OF THE INVENTION

The present invention relates generally to locks for air-line fittings or couplings and more particularly with means for preventing the unauthorized connection of an air-line fitting of a device, such as the air brake lines of a trailer, with the matching fittings on another device, such as a tractor.

Other than actually removing the air-line fittings themselves, with all of the attendent problems raised thereby, no known means is presently available for preventing the unauthorized connection of an air-line fitting for the air lines of a device, such as a trailer, with the air lines of another device, such as a tractor. There are known means of preventing movement of a trailer, such as blocks for the wheels, or large cumbersome locks for placing on the kingpins of the trailer. However, no simple, inexpensive means, such as the present invention, is known to prevent the unauthorized taking of separated, unattended trailers.

SUMMARY OF THE INVENTION

The present invention comprises a simple, low-cost, key operated lock plug for insertion into an air-line fitting of any device, such as the air-line fitting used to connect the air brake lines of a tractor to a trailer. The present invention comprises a key operated lock plug or tumbler lock which is placed into a disconnected air-line fitting, and locked in place. The lock includes a loop to enable a tag to be tied thereto to indicate why the air line and the attached device is out of service.

BRIEF DESCRIPTION OF THE DRAWINGS

FIG. 1 is a perspective view of an air-line fitting capable of being connected to any device or vehicle, such as the air brake line or lines of a trailer, with a lock plug of the present invention, above the fitting prior to insertion into the fitting.

FIG. 2 is a sectional view taken along line 2—2 of FIG. 1 showing the lock plug of the present invention inserted into and locked into position in the air-line fitting; and FIG. 3 is a partial sectional bottom view taken along line 3—3 of the air-line fitting of FIG. 2.

DESCRIPTION OF THE PREFERRED EMBODIMENT

Referring now more particularly to the accompanying drawing in which like and corresponding parts are designated by similar reference characters, numeral 10 indicates a lock plug. This bullet lock has a hollow cylindrical body 12 with a base 13 which is preferably formed integrally with body 12 so as to form a cup or thimble shaped enclosure. Within the housing 12, conventional locking means, such as pins, tumblers or the like, are provided and are unlocked by an operating means 14, such as a key, insertable into an opening or keyhole 16 formed in the top of a moveable locking member 18 rotatably held in the housing.

A plate 19, shown in broken lines in FIGS. 2 and 3, is fixedly attached to the bottom of the moveable locking member 18. Movement of the operating means from a first position to a second position will turn plate 19 and act to extend and retract a plurality of locking fingers or dogs 20 and 22, two of which are illustrated in the drawing. The locking fingers 20 and 22 are attached to one end of levers 23 and 25, respectively, as by pin means. The other end of each of the levers 23 and 25 are attached or pinned to the plate 19 to allow positive extension and retraction of the locking fingers whenever the operating means is turned from a starting or first position to a second position and back to the starting position. The locking fingers 20 and 22 could also be extended and retracted by other conventional means, such as a cam or spring operated device, connected between the moveable locking member 18 and the locking fingers 20 and 22.

The lock plug 10 of the present invention is used by inserting the operating means 14 into the opening 16 and turning the operating means to unlock and rotate the moveable locking member 18. The rotation of the moveable locking member in the proper direction, from a first or starting position to a second position, retracts the locking fingers 20 and 22 entirely into the cylindrical housing. The lock plug is then inserted into a passage opening 27 formed in an air-line fitting or coupling 28, also known as a "glad hand". The operating member is then turned back from the second position to the first position to cause the moveable locking member to be rotated back to the starting position and the locking fingers 20 and 22 to be extended.

The housing 12 may be of any desired diameter and length, but is preferably 11/16 of an inch (17.2 mm) in diameter, and from 1½ inches (37.5 mm) to 1⅝ inches (40.6 mm) in length. These specific dimensions allow the lock plug to be snugly held in position within a conventional air-line fitting used on the majority of trailers.

As shown in FIGS. 2 and 3, the conventional air-line fitting has a rubber ring or seal 24 having an inside diameter of 11/16 of an inch (17.2 mm) held firmly within an opening 26 having a diameter of approximately 1 inch (25 mm). To allow the lock plug 10 to be properly seated and firmly held within the air-line fitting, the locking fingers 20 and 22 abut up against an interior wall 30 with the base 13 pressed against an opposite interior wall 32. To insure this snug fit, the housing 12 should be 1⅝ inches (40.6 mm) long, and the distance from an imaginary centerline 35 running through the locking fingers 20 and 22 to the base 13 is preferably ⅜ of an inch (9.4 mm).

With the lock plug of the present invention securely locked in position in the air-line fitting 28, the air-line fitting cannot be attached to another air-line fitting. This will prevent air from being supplied to whatever device or vehicle the fitting is attached to, such as a pipe 34 connected to the air brakes of a trailer. In this manner, a simple, low-cost, key operated locking means is provided which prevents the unauthorized hookup of the air-line fittings of devices, such as trailers which have been removed from their respective coupling air-line fittings, such as on a tractor.

To allow the identification of any problem with a device, such as a trailer, which has been disconnected for maintenance or service, the lock plug of the present invention is provided with a loop or ring 36 fixed to the body 12, as by welding. A tag 38 may be tied to this loop, as shown in FIG. 2, and any problems or required service together with dates, may be written on the tag to allow a maintenance or service employee to identify a particular device, such as a trailer, and correct any problem.

While the invention has been described in considerable detail, it is not to be limited to such details as have been set forth except as may be necessitated by the appended claims.

What is claimed is:

1. In combination with a glad hand brake line coupler, a lock plug for insertion into and locking in place in a passage opening formed in said brake line coupler, said lock plug comprising a hollow cylindrical body having a base formed integrally with said body at one end thereof and a moveable locking member rotatably held in said body at the other end thereof; a plurality of locking fingers connected to said moveable locking member and extendable from and retractable into said body, and operating means insertable into an opening formed in said moveable locking member whereby the turning of said operating means from a first position to a second position will rotate said moveable locking member to retract said locking fingers into said hollow body to allow said lock plug to be inserted into said passage opening with the base thereof pressed against an interior wall of said coupler, and the turning of said operating means back from said second position to said first position will rotate said moveable locking member to thereby extend said locking fingers from said hollow body to thereby hold said lock plug within said brake line coupler by the abutment of said fingers against an interior wall of said fitting opposite said interior wall against which said base is pressed.

2. The lock plug of claim 1 wherein said operating member is a key insertable into a keyhole formed in said moveable locking member.

3. The lock plug of claim 1 wherein said lock plug includes a loop formed integrally therewith to enable a tag to be tied to said lock plug.

4. The lock plug of claim 1 or 2 wherein said hollow body has an outside diameter of 11/16 of an inch and a length of between 1½ inches and 1⅝ inches.

5. The lock plug of claim 1 wherein said hollow body has an outside diameter of 11/16 of an inch and a length of 1⅝ inches and the locking fingers are placed in said body a distance equal to ⅝ of an inch measured from said base to an imaginary centerline passing through said fingers.

* * * * *